United States Patent [19]
O'Connor et al.

[11] 3,918,309
[45] Nov. 11, 1975

[54] REDUNDANT INERTIAL MEASUREMENT SYSTEM WITH IMPROVED FAILURE-DETECTION CAPABILITY

[75] Inventors: Bernard J. O'Connor, Eastchester, N.Y.; Richard Shaw, Jr., Mahwah; Michael Epstein, New Milford, both of N.J.

[73] Assignee: The Bendix Corporation, Teterboro, N.J.

[22] Filed: Mar. 31, 1972

[21] Appl. No.: 240,082

[52] U.S. Cl. ................................................ 74/5.34
[51] Int. Cl. ............................................ G01c 19/00
[58] Field of Search ............ 33/321; 74/5.34; 244/79

[56] References Cited
UNITED STATES PATENTS

| | | |
|---|---|---|
| 3,282,119 | 11/1966 | Shaw, Jr. et al. ..................... 74/5.34 |
| 3,310,986 | 3/1967 | Baecher ............................. 33/321 X |
| 3,489,004 | 1/1970 | Barnhill et al. ....................... 74/5.34 |
| 3,597,598 | 8/1971 | McAllister et al. ................... 74/5.34 |

*Primary Examiner*—Manuel A. Antonakas
*Attorney, Agent, or Firm*—Anthony F. Cuoco; S. H. Hartz

[57] ABSTRACT

A redundant inertial measuring system includes at least two gimballed platforms each stabilized by at least three gyros. Means are provided for detecting excessive drift in at least one of the gyros and for eliminating the defective unit or units from control of the system. A particular feature of the invention is that all gimballed platforms are mechanically identical, and therefore interchangeable.

16 Claims, 4 Drawing Figures

REDUNDANT INERTIAL MEASUREMENT SYSTEM WITH IMPROVED FAILURE-DETECTION CAPABILITY

BACKGROUND OF THE INVENTION

1. Cross Reference to Related Applications

This invention is an improvement over the device described and claimed in U.S. application Ser. No. 114,772 filed on Feb. 12, 1971, by Frank S. DeCarlo and Bernard J. O'Connor and assigned to The Bendix Corporation assignee of the present invention.

2. Field of the Invention

This invention relates to redundant inertial measurement systems and, particularly, to a system of the type described including means for detection and isolation of gyros at unacceptable drift levels.

3. Description of the Prior Art

The aforenoted U.S. application Ser. No. 114,772 describes an inertial measurement system having two gimballed platforms, each of which is controlled by three single degree of freedom gyros cross connected and torqued in a manner suitable for detection and isolation of gyros having unacceptable drift. However, there are many possible double-failure conditions in which two excessive gyro drift rates are in such a ratio that the resulting platform drift is perpendicular to the axis of a torqued gyro, and in which event the failure is not detected. Further, the gyro orientation in respect to the platform inner gimbal is not consistent between the two platforms and hence the platforms are not interchangeable.

SUMMARY OF THE INVENTION

The system of the invention can be implemented by various combinations of two or more platforms, each carrying three or more gyros. A system comprising three platforms, each controlled by three gyros, will be described in detail, with the operation of other configurations being thereupon understood and more briefly described.

Thus, the system includes three platforms and three controllers. Each of the platforms has four gimbals, although the number of gimbals is irrelevant to the invention. Two speed resolvers, or other accurate angle sensors, measure the angular displacement of the gimbals and provide corresponding signals. The resolver signals are processed by the controllers, which may be either analog or digital devices, to provide gyro torquing signals. The torquing signals control the gimbals through conventional servos. In the configuration described, the input axes of the gyros are perpendicular to nine faces of a regular icosahedron and the inner gimbal axes of the platforms are perpendicular to the tenth face.

One object of this invention is to provide a redundant inertial measurement system having improved failure detection capability whereby excessive drift in one or more gyros is detected and defective units are eliminated from the system.

Another object of this invention is to provide a system of the type described wherein all gimballed platforms are mechanically identical and therefore interchangeable.

Another object of this invention is to provide a system of the type described which accommodates double failure conditions wherein two excessive drift rates are in such a ratio that the resulting platform drift is perpendicular to the axis of a torqued gyro.

Another object of this invention is to provide a system of the type described wherein the orientation of more than six gyro axes in space permits detection of all possible single and double failures by maximizing the scalar triple products of unit vector triads that are used in error detection. Gyro axes perpendicular to the faces of a regular icosahedron meet this condition.

Another object of this invention is to dispose gyros among two or more platforms in a manner so that the gyro axes on any platform can be made parallel to the gyro axes on any other platform by rotation about the platform inner gimbal axis. This feature makes the platforms interchangeable.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of invention.

DESCRIPTION OF THE INVENTION

Figure 1:
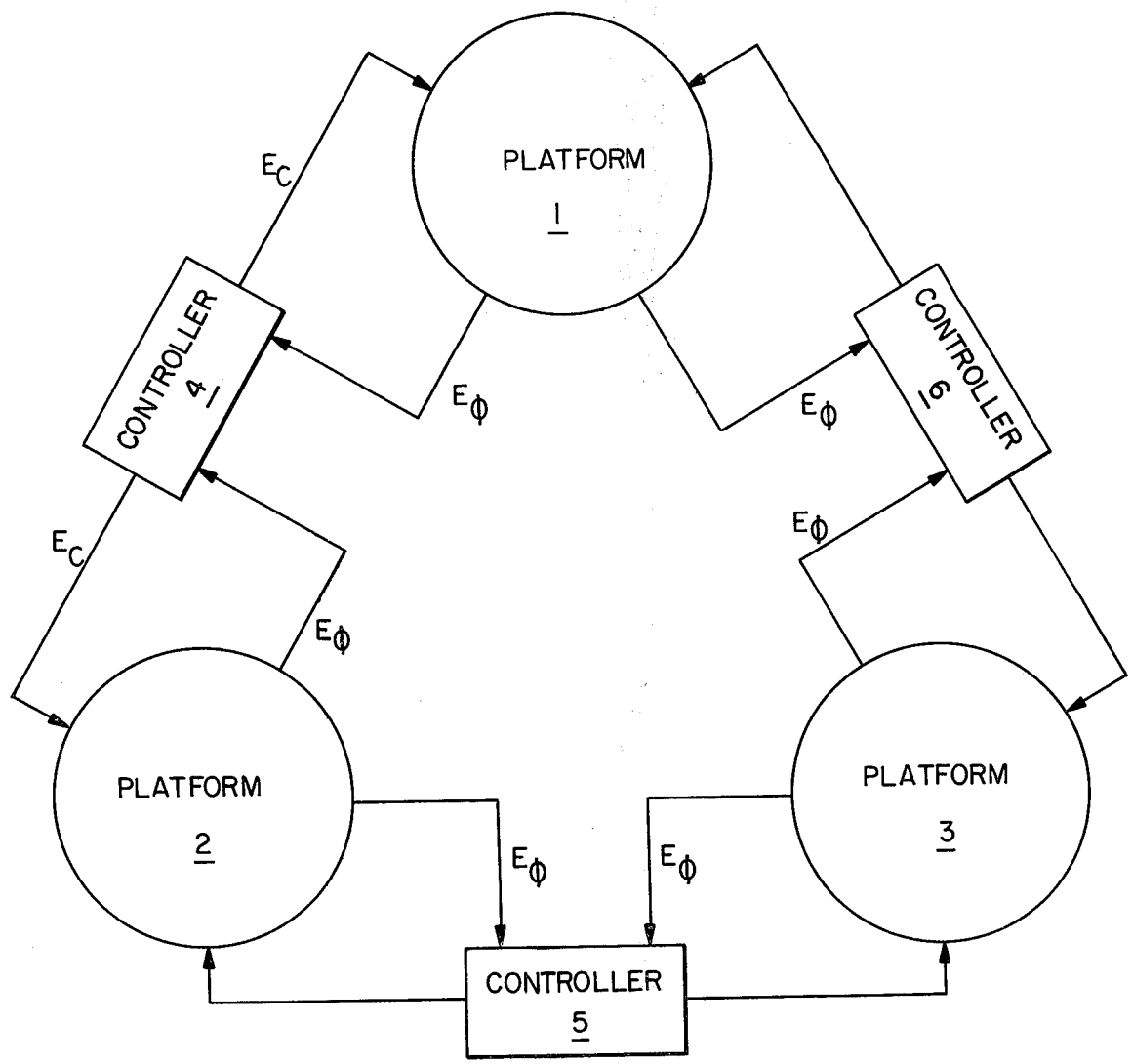
FIG. 1 is a diagrammatic representation of a system including three platforms and three controllers interconnected according to the invention.

FIG. 1 shows the system of the invention as generally including three platforms designated by the numerals 1, 2 and 3. A controller 4 receives gyro gimbal misalignment signals $E_0$ from platforms 1 and 2 and applies torque command signals $E_C$ to said platforms. A controller 5 receives gyro gimbal misalignment signals $E_0$ from platforms 2 and 3 and applies torque command signals $E_C$ to said platforms. A controller 6 receives gyro gimbal misalignment signals $E_0$ from platforms 1 and 3 and applies torque command signals $E_C$ to said platforms.

Figure 2:
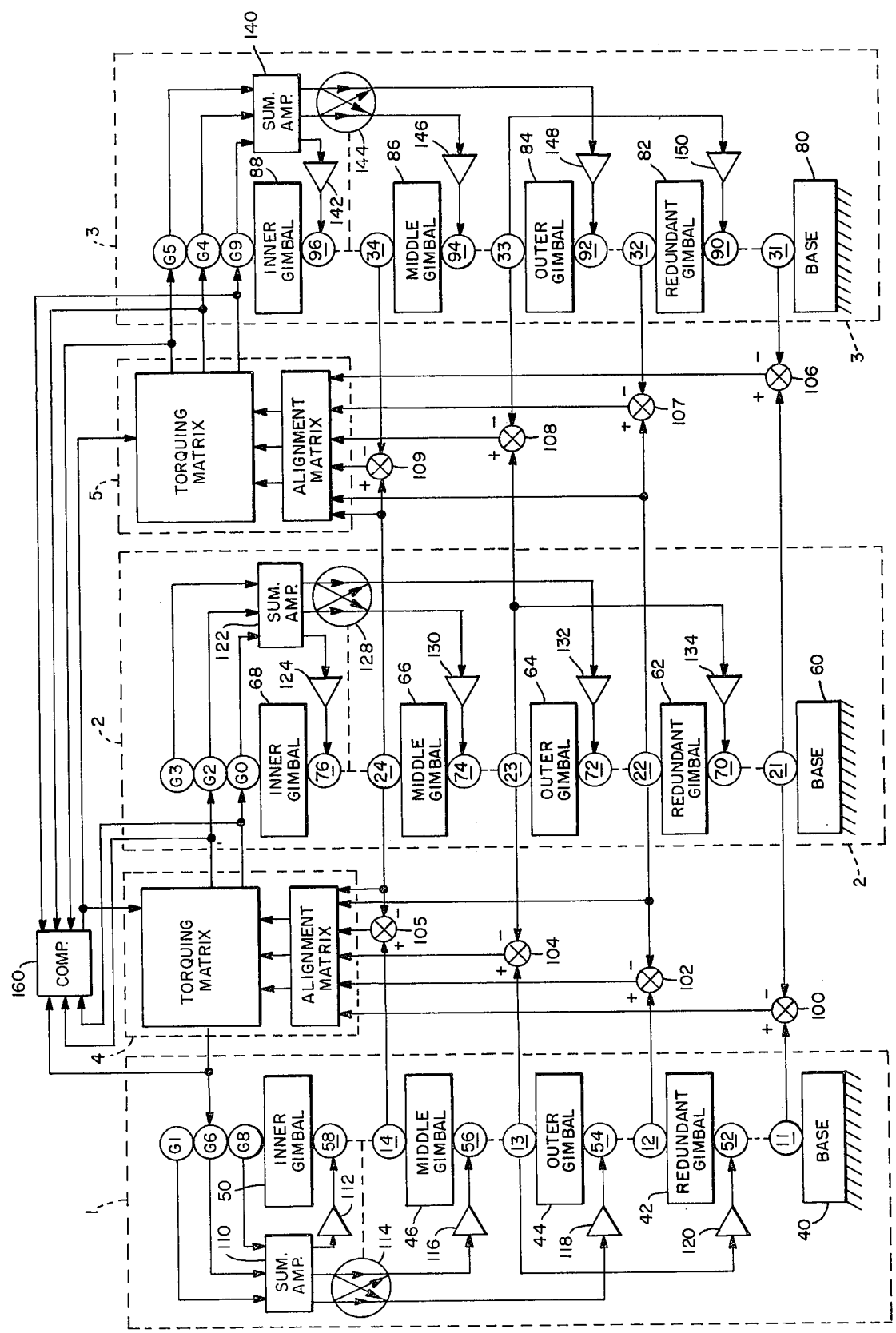
FIG. 2 is a block diagram of a system according to the invention and including three platforms each controlled by four gimbals and showing resolvers for measuring the angular rotation of the gimbals.

A specific arrangement of the invention is shown in FIG. 2, wherein platform 3 is effectively slaved to platform 2 and only controllers 4 and 5 are in the configuration. Thus, with reference to FIG. 2, platform 1 includes a base 40, a redundant gimbal 42 supported by the base, an outer gimbal 44, supported by the redundant gimbal, a middle gimbal 46 supported by the outer gimbal and an inner gimbal 50 supported by the middle gimbal as is well known in the art. Two speed resolvers or similar accurate angle sensors 11, 12, 13 and 14 are supported by base 40, redundant gimbal 42, outer gimbal 44 and middle gimbal 46, respectively, of platform 1. Torquer motors 52, 54, 56 and 58 are supported by redundant gimbal 42, outer gimbal 44, middle gimbal 46 and inner gimbal 50, respectively. Inner gimbal 50 supports gyros designated as G1, G6 and G8.

Platform 2 includes a base 60, a redundant gimbal 62 supported by the base an outer gimbal 64 supported by the redundant gimbal, a middle gimbal 66 supported by the outer gimbal and an inner gimbal 68 supported by the middle gimbal. Resolvers 21, 22, 23, and 24 are supported by base 60, redundant gimbal 62, outer gimbal 64 and middle gimbal 66, respectively. Torquer motors 70, 72, 74, and 76 are supported by redundant gimbal 62, outer gimbal 64, middle gimbal 66 and inner gimbal 68, respectively. Inner gimbal 68 supports gyros designated as G3, G2 and G0.

Platform 3 includes a base 80, a redundant gimbal 82 supported by the base, an outer gimbal 84 supported by the redundant gimbal, a middle gimbal 86 supported by the outer gimbal and an inner gimbal 88 supported by the middle gimbal. Resolvers 31, 32, 33 and 34 are supported by redundant gimbal 82, outer gimbal 84, middle gimbal 86 and inner gimbal 88, respectively. Torquer motors 90, 92, 94 and 96 are supported by redundant gimbal 82, outer gimbal 84, middle gimbal 86 and inner gimbal 88, respectively. Inner gimbal 88 supports gyros designated as G2, G4 and G5.

The output signals from resolvers 11, 12, 13, 14, 21, 22, 23 and 24 are processed by controller 4 to provide gyro torquing signals which are applied to gyro G6 in platform 1 and gyros G2 and G0 in platform 2. The output signals from resolvers 21, 22, 23, 24, 31, 32, 33, and 34 are processed by controller 5 to provide gyro torquing signals which are applied to gyros G4, G5 and G9 in platform 3.

With respect to controller 4 which includes a torquing matrix driven by an alignment matrix, the signals from resolvers 11 and 21 are summed by a summing means 100, the signals from resolvers 12 and 22 are summed by a summing means 102, the signals from resolvers 13 and 23 are summed by a summing means 104 and the signals from resolvers 14 and 24 are summed by a summing means 105. The signals from summing means 100, 102, 104, 105 are applied to said alignment matrix.

With respect to controller 5, which includes a torquing matrix driven by an alignment matrix, the signals from resolvers 21 and 31 are summed by a summing means 106, the signals from resolvers 22 and 32 are summed by a summing means 107, the signals from resolvers 23 and 33 are summed by a summing means 108 and the signals from resolvers 24 and 34 are summed by a summing means 109. The signals from summing means 106, 107, 108 and 109 are applied to said alignment matrix.

The signals from resolvers 22 and 24 are applied to the alignment matrix of controller 4 and are applied to the alignment matrix of controller 5. In this connection it is to be noted that controllers 4 and 5 and the respective matrices may be either digital or analog devices as the case may be.

Gyros G1, G6 and G8 on inner gimbal 50 of platform 1 control the platfrom gimbals through conventional servos. Thus, the output signals from gyros G, G6 and G8 are applied to a summing amplifier 110 and therefrom through a servo amplifier 112 to torquer motor 58. The gyro signals are also applied through summing device 110 to a resolver 114, which resolves the signals to the inner gimbal output, and therefrom through servo amplifiers 116, 118 to torquer motors 65 and 54, respectively. The signal from resolver 13 is applied through a servo amplifier 120 to torquer motor 52. In this connection it is noted that resolver 114 is connected by suitable mechanical means to resolver 14 and to torquer motor 58, and which resolver and torquer motor are connected one to the other as are resolver 11 and torquer motor 52, resolver 12 and torquer motor 54 and resolver 13 and torquer motor 56.

The signals from gyros G3, G2 and G0 on inner gimbal 68 of platform 2 are applied to a summing amplifier 122 and therefrom through a servo amplifier 124 to torquer motor 76. The gyro signals are applied through summing device 122 to a resolver 128 which resolves the signals to the inner gimbal output, and therefrom through servo amplifiers 130 and 132, to torquer motors 74 and 72, respectively. The signal from resolver 23 is applied through a servo amplifier 134 to torquer motor 70. Resolver 128 is connected by suitable mechanical means to resolver 24 and to torquer motor 76, and which resolver and torquer motor are connected one to the other as are resolver 21 and torquer motor 70, resolver 22 and torquer motor 72 and resolver 23 and torquer motor 74.

The output signals from gyros G5, G4 and G9 on inner gimbal 88 of platform 3 are applied through a summing amplifier 140 to a servo amplifier 142 and therefrom to torquer motor 96. The gyro signals are applied through summing device 140 to a resolver 144 which resolves the signals to the inner gimbal output and therefrom through servo amplifiers 146 and 148 to torquer motors 94, 92, respectively. The signal from resolver 33 is applied through a servo amplifier 134 to torquer motor 90. Resolver 144 is connected by suitable mechanical means to torquer motor 96 and resolver 34, and which resolver and torquer motor are connected one to the other as are resolver 31 and torquer motor 90, resolver 32 and torquer motor 92 and resolver 33 and torquer motor 94.

Figure 3:
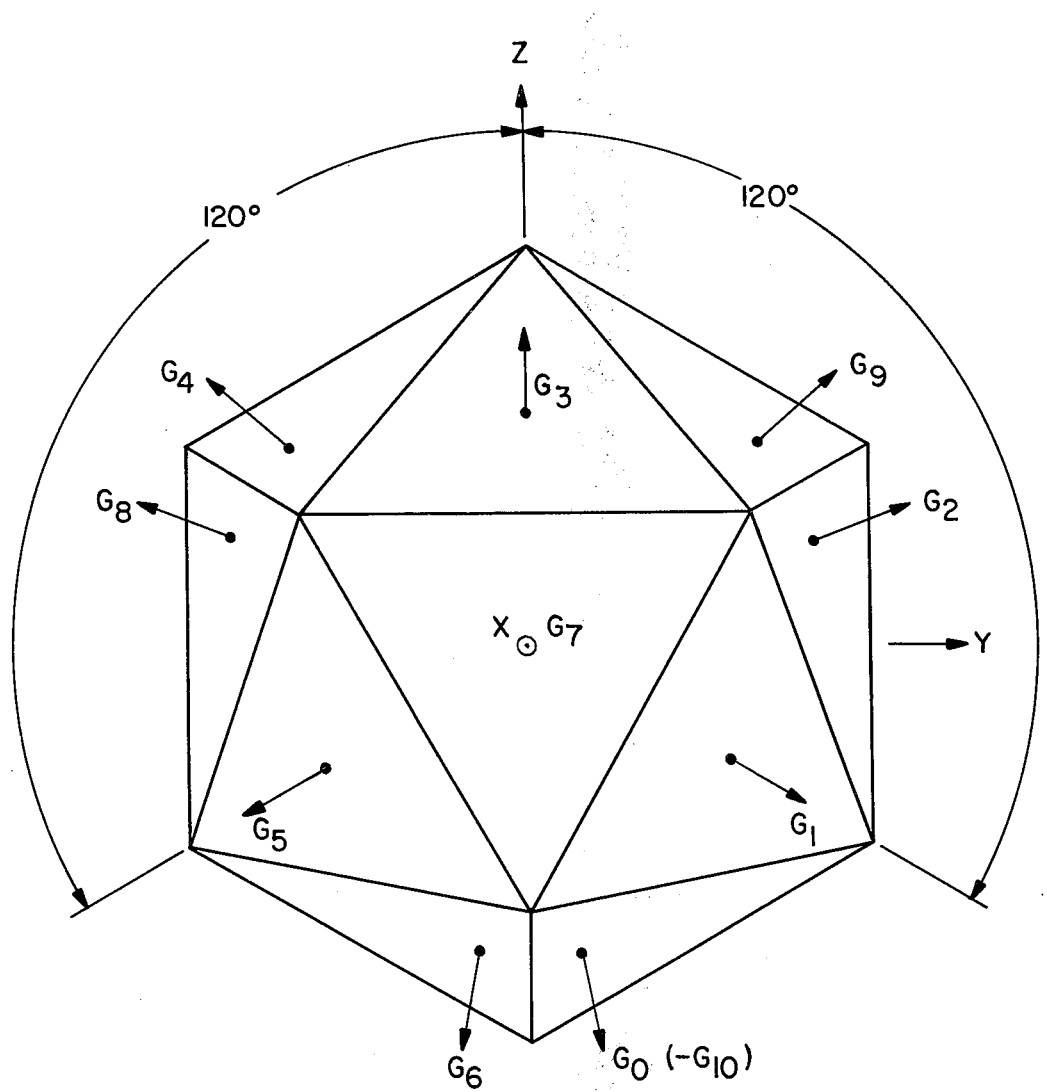
FIG. 3 is a diagrammatic representation showing the relation of the input axes of the gyros to the nine faces of a regular icosahedron.

The physical configuration of gyros G1, G6 and G8 on platform 1, gyros G3, G2 and G0 on platform 2 and gyros G5, G4 and G9 on platform 3 is best shown with reference to FIG. 3, wherein it is seen that the input axes of the gyros, having corresponding subscript numerals, are each perpendicular to one of nine faces of a regular icosahedron and the inner gimbal axes (which are coincident and designated as G7) are perpendicular to the tenth face.

Platforms 1 and 2 (FIG. 2) operate in a manner as described in the aforenoted U.S. application Ser. No. 114,772. It will suffice for purposes of describing the present invention to say that three of the six gyros on the two platforms, G1, G8 and G3 for example, are free and control the system. The remaining three gyros G6, G2 and G0 are torqued by signals derived from the gimbal angle differences provided by the torquing matrix of controller 4 in order to bring the platforms into alignment with each other. Mode switching may be provided to select various combinations of free and torqued gyros, as required by the error detection scheme and as will hereinafter be explained.

In normal operation, resolvers 21–24 and 31–34 determine the difference between the gimbal angles of platform 3 and the corresponding gimbal angles of platform 2. The difference signals provided by the resolvers are applied to the alignment matrix of controller 5, which may include for this purpose a resolver chain or digital computer, to provide orthogonal components $\alpha_{x23}$, $\alpha_{y23}$, $\alpha_{z23}$ of a small misalignment angle in a reference frame fixed to the inner gimbal of platform 3. It is to be noted that in a more conventional platform with orthogonal gyro axes, gyro torquing signals are proportional to components $\alpha_{x23}$, $\alpha_{y23}$, $\alpha_{z23}$. In the platforms being considered, however, the angles between gyro axes are not right angles and the torquing signals provided by the summing amplifiers (122, 140) are proportional to linear combinations of $\alpha_{x23}$, $\alpha_{y23}$, $\alpha_{z23}$. In the configuration of FIG. 2, torques are in a direction to reduce the misalignment so that platform 3 is effectively slaved to platform 2. Controllers 4 and 5 and 6 (FIG. 1) may include switching means to operate in the mode described, or in a mode with platforms 2 and 3 as a coupled pair and platform 1 slaved to platform 3, or in a mode with platforms 3 and 1 as a coupled pair and platform 2 slaved to platform 1.

Gyro drifts are evaluated from torquing currents as described in the aforenoted U.S. application Ser. No. 114,772, except that in the present invention six torquing currents are now available for this purpose instead of three. The additional information, i.e., three additional torquing currents, resolves ambiguities in the previous system. By way of illustration, consider the operating mode described with reference to FIG. 2, i.e. platforms 1 and 2 operating as a coupled pair with gyros G1, G8 and G3 free and gyros G6, G2 and G0 torqued; platform 3 slaved to platform 2 by torquing gyros G5, G4, and G9. Using the established convention that a logic 1 indicates excessive torquer current while logic 0 indicates torquer current within a specified limit, if the system were limited to the information available from platforms 1 and 2, a single logic 1 would indicate a failure of a torqued gyro, two 1's would indicate failure of two torqued gyros and three 1's would indicate failure of all three torqued gyros or of any one free gyro. A system of this type is uncapable of indentifying a significant set of double failures.

If it is assumed that two free gyros fail and their drift rates are in a ratio so that the platform drift is perpendicular to one of the torqued gyros, no torque is required in the one gyro. Even if the platfrom drift were not exactly perpendicular to the sensitive axis of the torqued gyro, the torquer current would be within the limit and the failure indication would still be two logic 1's and a logic 0. It is also possible that a free gyro and a torqued gyro may both drift excessively in such a manner that the drift of the torqued gyro provides the rotation that would have been provided by the torquer if the free gyro alone had failed. In the absence of other information, it is assumed that two torqued gyros had failed in an unrelated manner since this event is more probable than correlated failure of two free gyros. But since system drift depends on the free gyros, it is necessary to know their status.

Torque currents required by the gyros in platform 3 provide the necessary information. None of these gyros is aligned with any gyro in platform 1 or 2, therefore the system drift that is perpendicular to one of the gyros in platform 1 or 2 cannot be perpendicular to any gyro in platform 3. The correlated failure of two free gyros would therefore be signaled by five logic 1's and a 0, whereas a failure of two torqued gyros would result in two 1's and four 0's. In order to identify all possible signals and double failures the system must operate in several modes. The following table gives the minimum adequate set, although not the only possible one:

| Platform Mode | 1 | | 2 | | 3 | |
|---|---|---|---|---|---|---|
| | Pair 1, 2 | Slave 3 | Pair 2, 3 | Slave 1 | Pair 3, 1 | Slave 2 |
| Gyro Mode | Free | Torqued | Free | Torqued | Free | Torqued |
| 1 | 168 | 320 549 | 320 | 549 168 | 549 | 168 320 |
| 2 | 160 | 832 549 | 329 | 054 168 | 548 | 916 320 |
| 3 | 183 | 620 549 | 305 | 249 168 | 591 | 468 320 |
| 4 | 632 | 180 549 | 254 | 309 168 | 416 | 598 320 |
| 5 | 830 | 162 549 | 059 | 324 168 | 918 | 546 320 |
| 6 | 820 | 163 549 | 049 | 325 168 | 968 | 541 320 |
| 7 | 320 | 168 549 | 549 | 320 168 | 168 | 549 320 |

It will now be understood from the teachings herein and from those of the aforenoted U.S. application Ser. No. 114,772, that failure of a torqued gyro is indicated by a single logic 1; Drift of a torqued gyro does not affect platform drift; Failure of two torqued gyros is always indicated by two logic 1's whereas failure of one free gyro is indicated by six logic 1's. Faiure of two free gyros is indicated by either five or six logic 1's and failure of one free gyro and one torqued gyro is indicated by either five or six logic 1's. Drift of a free gyro causes platform drift.

One characteristic of the system described is that changes in a gyro mode do not affect misalignment angles between corresponding gimbals of the coupled pair of platforms. The slaved platform, on the other hand, experiences a slight realignment. The realignment process takes an interval of approximately 2 minutes. Therefore, the gyro torquing signals in the coupled pair of platforms provide useful information continuously whereas torquer signals from the slaved platform must not be used for failure identification until the interval expires after a change of gyro mode. On the basis of the foregoing, a mode switching schedule which requires a digital computer may be utilized. As shown in FIG. 2, the computer is designated by the numeral 160 and, in the mode illustrated, receives inputs from controlled gyro G6 on platform 1, controlled gyros G2 and G0 on platform 2 and controlled gyros G5, G4 and G9 on platform 3. The output from the computer is applied to the torquing matrices of controllers 4 and 5.

The system may start in any mode. If all gyros are operating within tolerance, the indication is six 0's and the system remains in that mode. The occurence of 1's requires no action until either the three signals from the coupled platform (platforms 2 and 3) or the three signals from the slaved platform (platform 1) are all 1's. In this case, computer 160 switches the system to another mode. If three 1's appear in the signals from the coupled pair of platforms, the system is again switched to another mode. This is repeated until at least one 0 appears in the signals from the coupled pair of platforms.

If, after the aforenoted interval, at least one 0 has appeared in the signals from the slaved platform, no further mode switching occurs. Otherwise the process continues. Thus, the system will not remain in any mode unless a total of at least two 0's are present. If the indication from the coupled pair of platforms is three 1's in all modes, more than three gyros have failed among the six in the pair of platforms. The system must then be switched to another platform mode (using a different coupled pair) and the error detection process must be repeated. This condition cannot occur if one or more free gyros is drifting excessively. The switching schedule is summarized in the following table:

| | Failure Indication | | |
|---|---|---|---|
| Coupled Pair | Slaved Platform | | Action |
| | Immediate | After 3 min. | |
| 000, 100, or 110 | | 000, 100, or 110 | None |
| 111 | any | any | Change gyro mode |
| any | | 111 | Change gyro mode |
| 000, 100, or 110 | any | | Wait Interval |
| 111 in all gyro modes | any | | Change Platform mode |

The advantages of the icosahedron configuration shown in FIG. 3 may be better realized if it is first considered that for a single platform having three gyros, the sensitive axes of the gyros must not be coplanar, for in that case rotation about an axis perpendicular to the plane of the gyro axes would not be detected and platform drift would become infinite. Indeed, it can be shown that the ratio of platform drift to gyro drift, $W_{ia}$, is roughly inversely proportional to the scalar triple product of unit vectors $(l_i, l_j, l_k)$ along the gyro sensitive axes:

$$W_{ia} = 1/\ (l_i \times l_j \times l_k)$$

The scalar triple product is zero when the gyro axes are coplanar and maximum when they are orthogonal.

When two platforms operate as a coupled pair, the scalar triple product of unit vectors along the free gyro axes is an inverse measure of platform drift and should be as large as possible. With the arrangement of the aforenoted U.S. application Ser. No. 114,772, the scalar triple product for the six combinations of free gyros is maximized. The configuration of the present invention has been developed to improve the capability of detecting correlated double failures.

Thus, from the aforenoted U.S. application Ser. No. 114,772 if two gyros fail the platform drift must be perpendicular to the sensitive axis of the remaining free gyro. If the drift rates of the two failed gyros are in such a ratio that one of the torqued gyros senses no drift, the platform drift is perpendicular to that torqued gyro. If one free gyro fails, the platform drift is perpendicular to the two remaining gyros. The additional failure of a torqued gyro does not alter this condition.

Figure 4:
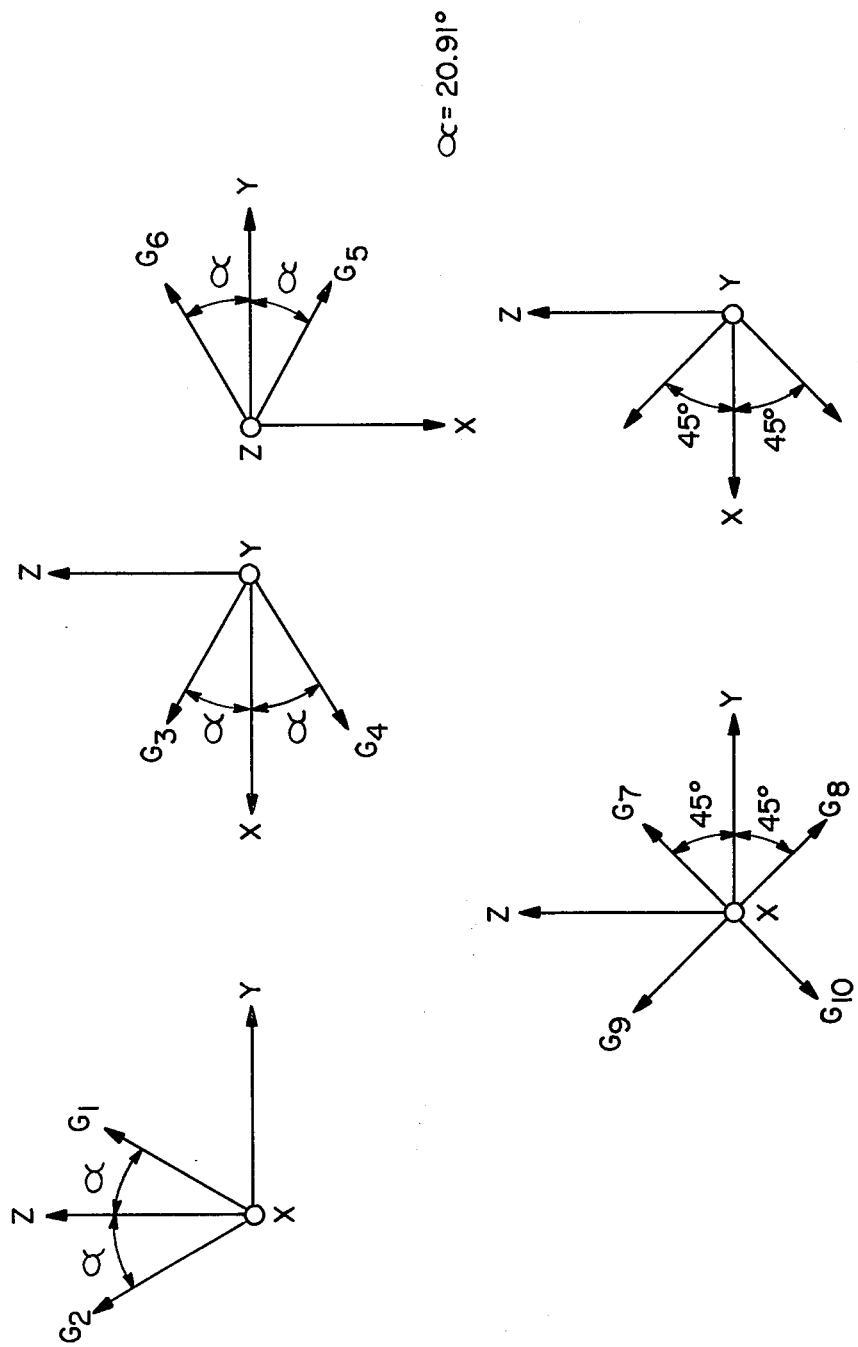
FIG. 4 is a diagrammatic representation showing the disposition of gyro gimbal axes according to the invention.

This leads to the conclusion that in all correlated double failures that are not detected by the previous arrangement, the platform drift is perpendicular to two gyro axes. Detection of these drifts therefore requires additional gyros, the axes of which have significant components perpendicular to all possible pairs of axes in the first set. This requirement is met if the scalar triple products of unit vectors along the new gyro axes with all possible pairs of unit vectors along the previous axes are large. FIG. 4 shows a set of axes that meet this requirement. The scalar triple products of the triads from axes $G_1$ through $G_6$ have been slightly reduced to increase the products including axes $G_7$ through $G_{10}$. These 10 axes are perpendicular to the parallel pairs of faces of a regular icosahedron, as described with reference to FIG. 3.

The necessary double failure detection capability can be achieved by installing four gyros on each of two platforms, and having axes $G_1$, $G_3$, $G_5$ and $G_7$ on one and axes $G_2$, $G_4$, $G_6$, and $G_7$ on the other. In this case, the two gyros aligned along axis $G_7$ would not be in the gimbal servo loops. Each gyro would be connected in a self-caging loop and its torquer current would be monitored for failure detection.

Improved reliability through redundancy of components other than gyros is achieved by placing three gyros on each of three platforms. Interchangeability of the three platforms is highly desirable and can be achieved by setting the inner gimbal axis along axis $G_7$ and mounting the gyros with their sensitive axes along axes $G_1$, $G_6$ and $G_8$. Rotations of 120° and 240° about the inner gimbal axes transform axes $G_1$, $G_6$, $G_8$ into axes $G_3$, $G_2$–$G_{10}$ and axes $G_5$, $G_4$, and $G_9$, respectively. Thus, the only difference between the platforms is the inner gimbal angle which can be controlled by external means. This fact can be readily demonstrated by matrix transformation and it is apparent from inspection of FIG. 3, wherein $-G_{10}$ is $G_0$.

In summation it will be understood that the orientation of more than six gyros in space in a manner that permits detection of all possible single and double failures, as provided by the present invention, is distinctly advantageous. This is accomplished by maximizing the scalar triple products of unit vector triads that are used in error detection. Axes perpendicular to the faces of a regular icosahedron meet this condition.

The gyros are disposed among two or more platforms in such a manner that the gyro axes on any platform can be made parallel to the gyro axes on any other platform by rotation about the platform inner gimbal axis. This feature makes the platforms interchangeable and represents a distinct advantage when spare parts and hardware factors are taken into account.

In a system containing many gyros and having means to select certain groups of three gyros to be unrestrained for controlling the system while all the others are torqued to follow the three free gyros, use of the 110 — 110 criterion to select the group of three unrestrained gyros is featured. Here the 1 indicates excessive torquer current in one of the torque gyros.

The invention described may be implemented in various ways. In particular, nine gyros may be divided among three platforms with gyros G1, G4, G9 on platform 1, gyros G3, G6 and G8 on platform 2, and gyros G5, G2 and G0 on platform 3. Drift performance will be identical to that of the arrangement described.

It will be further understood that many other combinations of gyros and platforms may be similarly utilized. For example, eight gyros may be distributed between two platforms so that gyros G3, G8, G10 and G1 are on platform 1, gyros G4, G9, G7 and —G1 are on platform 2, and the inner gimbal axis along X is as shown in FIG. 4. 180° rotation about the inner gimbal axis then converts the first set into the second.

Alternately a vehicle might carry four platforms, each having three gyros. Three of the platforms would be interconnected in the manner described and means would be provided to connect the fourth in place of any of the other three as required.

Although but several embodiments of the invention have been illustrated and described, it is to be expressly understood that the invention is not limited thereto. Various changes may also be made in the design and arrangement of the parts without departing from the spirit and scope of the invention as the same will now be understood by those skilled in the art.

What is claimed is:

1. A redundant inertial measuring system, comprising:
   at least two platforms;
   each platform supporting at least three gyros for stabilizing the platform;
   the gyros being oriented by disposing the gyro axes substantially normal to the pairs of parallel faces of a regular icosahedron for maximizing the scale triple products of unit vector triads;
   means for providing signals corresponding to angular misalignment between the platforms; and
   means connected to the last mentioned means and to selected gyros for controlling said gyros in response to the misalignment signals.

2. A system as described by claim 1, wherein each of the platforms includes:
   gimbal means;
   torquing means supported by the gimbal means;
   means connected to the gyros supported by the platform for summing output signals therefrom and for providing a summation signal; and
   the torquing means connected to the summing means and responsive to the summation signal for torquing the gimbal means.

3. A system as described by claim 1, wherein:
   each of the platforms includes a base and inner, middle, outer and redundant gimbals;
   sensors are supported by the base and the gimbals for sensing the angular displacement thereof and for providing corresponding signals; and
   the means for providing signals corresponding to angular misalignment between the platforms includes means connected to corresponding sensors on selected platforms for summing the signals therefrom.

4. A system as described by claim 3, wherein:
   the gyros are supported on the platform inner gimbal.

5. A system as described by claim 3, including:
   means connected to the gyros supported by the platform for summing the signals therefrom;
   torquing means supported by the inner gimbal and connected to the gyro signal summing means for torquing the inner gimbal in response to the signal from said means;
   torquing means supported by the middle gimbal and connected to the gyro signal summing means for torquing the middle gimbal in response to the signal from said means;
   torquing means supported by the outer gimbal and connected to the gyro signal summing means for torquing the outer gimbal in response to the signal from said means; and
   torquing means supported by the redundant gimbal and connected to the outer gimbal sensor for torquing the redundant gimbal in response to the signal from the sensor.

6. A system as described by claim 5, wherein:
   the inner gimbal torquing means is coupled to the middle gimbal sensor;
   the middle gimbal torquing means is coupled to the outer gimbal sensor;
   the outer gimbal torquing means is coupled to the redundant gimbal sensor; and
   the redundant gimbal torquing means is coupled to the base sensor.

7. A system as described by claim 5, including:
   a resolver connected to the gyro signal summing means and coupled to the inner gimbal torquing means for resolving the signal from said summing means to the inner gimbal output; and
   the middle and outer gimbal torquing means connected to the gyro signal summing means through the resolver.

8. A system as described by claim 1, wherein:
   two platforms are in a coupled pair configuration; and
   a third platform is slaved to one of the two platforms.

9. A system as described by claim 8, wherein:
   each of the three platforms supports three gyros; and
   the gyro controlling means is connected to one of the gyros on one platform and to two of the gyros on the other platform of the coupled pair, and connected to all three of the gyros on the slaved platform.

10. A system as described by claim 1, including:
    means connected to the gyro controlling means and controlled thereby for detecting excessive drift in at least one of the gyros and for eliminating said gyros from the system.

11. A system as described by claim 1, including:
    three platforms, each having an inner gimbal for supporting three gyros; and
    each of the gyro axes being substantially normal to a different pair of the nine parallel pairs of faces of the regular icosahedron and the inner gimbal axes being normal to the tenth pair of parallel faces.

12. A system as described by claim 1, wherein:
    each of the platforms includes an inner gimbal; and
    the gyros are supported on the inner gimbals of the platforms and arranged so that the gyro axes on one platform can be made substantially parallel to the gyro axes on any other platform by rotation about the inner gimbal axis.

13. A redundant inertial measuring system, comprising:
    at least two platforms, each of which includes an inner gimbal;
    each of the inner gimbals supporting at least three gyros for stabilizing the platform, said gyros arranged so that the gyro axes on one platform can be made substantially parallel to the gyro axes on any other platform by rotation about the inner gimbal axis;
    the gyros being oriented by disposing the gyro axes substantially normal to the pairs of faces of a regular icosahedron for maximizing the scaler triple products of unit vector triads;
    means for providing signals corresponding to angular misalignment between the platforms;
    means connected to the last mentioned means and to selected gyros for controlling said gyros in response to the misalignment signals; and
    means connected to the gyro controlling means and controlled thereby for detecting excessive drift in at least one of the gyros and for eliminating said gyros from the system.

14. A system as described by claim 13, including:
    means connected to the gyros on each of the platforms for summing the signals therefrom and for providing a summation signal; and
    each of the platforms being connected to a corresponding summing means and controlled by the summation signal therefrom.

15. A system as described by claim 14, including:

means connected to the summing means for resolving the summation signal therefrom to the inner gimbal output; and the platform being connected to the resolving means and controlled by the signal therefrom.

16. A system as described by claim 13, wherein:
each of the gyro axes is substantially normal to a different pair of parallel faces of a regular iscosahedron.

* * * * *